United States Patent [19]

Morper et al.

[11] Patent Number: 4,551,250
[45] Date of Patent: Nov. 5, 1985

[54] PROCESS FOR THE ANAEROBIC BIOLOGICAL PURIFICATION OF WASTEWATER

[75] Inventors: Manfred Morper, Gelting; Uwe Fuchs, Munich, both of Fed. Rep. of Germany

[73] Assignee: Linde Aktiengesellschaft, Wiesbaden, Fed. Rep. of Germany

[21] Appl. No.: 634,520

[22] Filed: Jul. 26, 1984

[30] Foreign Application Priority Data

Jul. 26, 1983 [DE] Fed. Rep. of Germany ....... 3326939

[51] Int. Cl.⁴ .................................................. C02F 3/28
[52] U.S. Cl. ...................................... 210/603; 210/617
[58] Field of Search ......... 210/603, 617, 618, 614–616, 210/631

[56] References Cited

U.S. PATENT DOCUMENTS

| 4,182,675 | 1/1980 | Jeris ................................. 210/603 X |
| 4,253,947 | 3/1981 | Fan et al. ......................... 210/618 X |
| 4,256,573 | 3/1981 | Shimodaira et al. ............. 210/618 |
| 4,351,729 | 9/1982 | Witt ................................ 210/617 X |
| 4,444,664 | 4/1984 | Treyssac ........................... 210/617 |

Primary Examiner—Thomas Wyse
Attorney, Agent, or Firm—Millen & White

[57] ABSTRACT

In a process for the anaerobic biological purification of wastewater containing organic pollutants, the wastewater to be purified is conducted through two series-connected reactors (2 and 5) operated under anaerobic conditions. In order to achieve a shortening of the residence time for the wastewater to be purified and thereby a savings in total reactor volume, the pollutants contained in the wastewater, which are present partially in the undissolved, partially in the macromolecular state and are only slowly metabolizable under anaerobic conditions, are retained in the first reactor (2) by means of a filter medium (3) arranged in the first reactor (2). On the other hand, pollutants initially present in the dissolved condition in the wastewater and which are readily degradable by anaerobic microorganisms, are further conducted directly through the first reactor, without substantial conversion, into the second reactor (5) through a connecting conduit (4). In the first reactor (2), the residence time of only the slowly metabolizable pollutants is determined to be sufficient so that the latter are degraded to low-molecular, dissolved fragments. Subsequently, the dissolved fragments are introduced into the second reactor (5) together with the initially rapidly degradable pollutants.

12 Claims, 2 Drawing Figures

PROCESS FOR THE ANAEROBIC BIOLOGICAL PURIFICATION OF WASTEWATER

CROSS REFERENCE TO RELATED APPLICATION

This invention is related to copending application Ser. No. 578,900 filed Feb. 10, 1984 which is commonly assigned, and which is incorporated by reference herein.

BACKGROUND OF THE INVENTION

This invention relates to a process for the anaerobic biological purification of wastewater containing organic pollutants wherein the wastewater to be purified is conducted through two reactors connected in series and operated under anaerobic conditions. The invention also relates to the apparatus for conducting the process.

In conventional wastewater purification processes of this type it is often the case that high-molecular weight, undissolved pollutants present in a wastewater of complex composition are converted, in the first reactor, into dissolved fragments by means of hydrolysis, and these fragments are then reacted to short-chain organic acids, acetic acid, alcohols, $H_2$, and $CO_2$ together with the pollutants initially contained in the wastewater in the dissolved state. This is done in an acidification phase by the use of various microorganisms, described as nonmethanogenic and consisting of facultative and obligate groups of anaerobic bacteria. Collectively, these microorganisms are sometimes also identified in the literature as "acid formers".

The resultant organic acids and alcohols from the first reactor are then first converted primarily to acetic acid in an acetogenic phase, i.e., in a phase promoting the formation of acetic acid, in the second reactor. Subsequently, i.e., in a phase favorable to methane production, methane is then produced primarily from the formed acetic acid and from $H_2$ and $CO_2$.

This association of the two conversion phases, as discussed above, within the two reactors results from the fact that initially the hydrolysis and acidification reactions generally proceed in parallel and do not depend on each other with the hydrolysis primarily occurring in the first reactor along with acidification and some methane formation. On the other hand the acetogenic and acid forming bacteria and methanogenic bacteria are dependent on each other in their metabolism and therefore, depend on occupying joint living space, and must be in a state of dynamic equilibrium in the second reactor. For a more complete discussion of this process microbiology see the test "Wastewater Engineering, Treatment/Disposal/Reuse", 2nd Edition, Metcalf and Eddy, McGraw-Hill, 1979, pp. 457–458.

In this application it is noted that "difficult to degrade", "gradually degradable", "slowly degradable", "low-rate" and "high molecular weight and undissolved" ingredients are used interchangeably and mean the same thing. Likewise, "rapidly degradable", "rapid rate", "readily degradable and dissolved" and "low molecular weight" ingredients are also used interchangeably and mean the same thing.

In general, by low-rate substances, examples thereof include, but are not limited to, partially dissolved and partially macromolecular materials, e.g., proteins, long-chain fatty acids, fats, vegetable oils, tallow, bacterial and yeast cell-walls, celluloses, hemicelluloses, starch, in emulsified, suspended or colloidal state as discharged, e.g., from slaughterhouses, dairies, rendering plants, oil mills, pharmaceutical and organochemical plants, pulp and paper factories.

Furthermore, the low-rate substances are typified by a rate of metabolism which is significantly lower than rapid-rate substances. For example, acetic acid, as contained in condensates of sulfite pulping plants or glucose, as contained in sugar factory wastewaters, are rapid-rate substances, for as low-molecular, polar substances they are readily dissolved in water, and the metabolic pathway to methane is short. Proteins, fats, vegetable oils, etc., as contained in food producing plants, are on the other hand low-rate substances as they are of high molecular weight and/or are relatively non-polar they are in a suspended, emulsified or colloidal state; and their metabolic pathway to methane is longer, requiring a hydrolysis and depolymerisation step first.

For a given organic wastewater load, e.g., expressed as COD, low-rate substrates show an overall digestion rate which is typically only 5 to 30% of those found with rapid-rate substances.

The problem in treating such a wastewater stream of complex composition as discussed above containing in addition to readily degradable, low-molecular weight and dissolved ingredients, also high-molecular weight and undissolved ingredients that are difficult to degrade, resides in the fact that the hydrolysis of the difficult-to-degrade wastewater ingredients proceeds slowly, as discussed above, compared to the other components. Thus, this hydrolysis becomes the "rate-limiting" step in the overall process since full degradation can take place only after fermentative bacteria have disintegrated the wastewater ingredients that are difficult to degrade into smaller more easily digestible particles. This necessarily requires large tank volumes, at least in the first reactor, since typically the entire wastewater stream must be retained in the first reactor until the high-molecular weight, undissolved wastewater ingredients have been converted into dissolved fragments and transformed, together with the readily degradable wastewater ingredients, into acetic acid, alcohols, $H_2$, $CO_2$, and organic acids, such as butyric acid and propionic acid.

SUMMARY OF THE INVENTION

It is thus an object of the invention to provide a process of the above-discussed type, which provides a shortening of the overall residence time and thus provides for a savings in reactor volume while at the same time maintaining a high degree of purification.

It is another object to provide such a process in a simple and economical fashion.

Still another object is to provide an apparatus for conducting such a process.

Upon further study of the specification and appended claims, further objects and advantages of this invention will become apparent to those skilled in the art.

These objects are attained according to the invention by retaining the pollutants contained in an incoming wastewater stream which are present partially in the undissolved, partially in the macro or high molecular condition, and are only slowly metabolizable under anaerobic conditions, in a first reactor with the aid of a medium having filtering activity; this medium being provided in the first reactor. The pollutants initially present in the dissolved state in the incoming wastewater stream and which are rapidly degradable by anaerobic microorganisms are transferred through the first reactor directly into the second reactor without substantial conversion in the first reactor, because of the low pH there (<7), due to formation of short-chain fatty acids (acetic acids, butyric acids etc), which is unfavorable for methane formation. By adding the filtering medium having the property to retain the gradually degradable pollutants either in suspension, emulsion or colloidal state, the volume of the first reactor can be sufficiently small so that substantially only the gradually metabolizable pollutants achieve any residence time therein sufficient to be degraded to low-molecular weight, dissolved fragments. The dissolved and degraded fragments are then subsequently conducted to the second reactor together with the initially rapidly degradable pollutants for further treatment.

As a result of conducting the process according to the invention, the reaction velocity, i.e., the rate of reaction, of the most slowly proceeding reactions, namely conversion of undissolved materials into dissolved materials by means of enzymes, as well as hydrolysis of macromolecular compounds, such as polysaccharides, proteins, and fats, is no longer a determining factor for the hydraulic residence time of the entire wastewater stream in the first reactor. Instead, the dissolved substances present in readily degradable form can be transferred continuously through the first reactor directly into the second reactor wherein then degradation in an acidification, acetate-forming, and methane-forming phase can commence immediately while the hydrolysis of the waste-water ingredients that are difficult to degrade is still being performed in the first reactor. Thus, the readily degradable wastewater ingredients can be degraded, as seen in a total context, in a smaller reactor volume than previously possible. Additionally, by retaining the pollutants that are difficult to degrade in the first reactor with the aid of the medium having filtering activity, an increase in the concentration of the wastewater ingredients that are difficult to degrade is simultaneously also achieved in the first reactor because the requirement of providing a volume for the readily degradable components is no longer necessary since they are passed directly to the second reactor.

The advantage of having two reactors instead of one will depend on the percentage of slowly degradable COD, on the reaction rate constants for rapidly and slowly degradable COD, on concentration increase of slowly degradable COD in the first reactor, on the overall COD-elimination required etc. For typical concentrated waste water a minimum share of slowly degradable COD of 10% can be assumed to give enough saving in reactor volume. Process economy increases with increasing percentage of slowly degradable COD, with principally no upper limit. If all degradable COD are slowly degradably ingredients reduction of reactor volume is very high, because with a given reaction time, reactor volume decreases by COD concentration increase in the first reactor.

With only 10% slowly degradable COD an average reduction in reactor volume of 20% compared to a single stage version can be expected, while with ≧90% slowly degradable COD, savings of 80% and more can be calculated. Thus, the volume of the first reactor can be reduced in relation to the attainable increase in concentration.

If, according to an advantageous embodiment of this invention, the medium exhibiting the filtering activity employed herein is a medium which simultaneously also acts as a settling or carrier substrate for microorganisms, the volume of the first reactor can also be further decreased as a result of the microorganisms participating in the conversion of the macromolecular, undissolved compounds are present in a high concentration. In this connection, materials having large and open macropores throughout are utilized for the medium having filtering activity. This is so that as a result of the open macropores the bacteria are supplied with a large surface area for settling, and distribute themselves uniformly and firmly fixed over this surface area and within the macropores. In addition, the bacteria are forced into decentralized growth by the open macropores. This results in large mass transfer surface areas so that the attainable breakdown efficiency with respect to conversion of the macromolecular, undissolved compounds into dissolved, low-molecular compounds is very high. Additionally, the bacteria are protected from abrasion in the macropores and thus, during transfer of the readily degradable wastewater ingredients into the second reactor, there is very little flushing out of bacterial mass from the first reactor. If the filtering or support medium itself consists of individual carrier/filtering particles, whereby the mass transfer surface is further increased as compared with the use of entire macroporous blocks, then a grid or screen must be provided at the outlet of the reactor to prevent flushing out of the medium. The mesh width of such grid or screen must as a result be smaller than the smallest particle size.

In a preferred embodiment the first reactor is operated as a solid-bed or fluidized-bed reactor. In this case the volume proportion of the filtering or support medium present in the reactor can be chosen to be relatively high as compared to other type of reactors. Thus, the resultant mass transfer surfaces are also large. Selection of a solid-bed reactor or a fluidized-bed reactor depends on the specific gravity of the filtering or support medium employed, a medium having a lower specific gravity is, of course, better suited to create a fluidized bed, but also entails smaller mass transfer surface areas due to the requirement of a less dense packing of the medium as compared to the solid bed. For example, in comparison the volume proportion of the medium to the total reactor volume can be 40-70%, preferably 45-55%, for formation of a fluidized bed whereas it can be 70-90%, preferably 75-85%, in a solid bed or fixed bed reactor.

Fully mixed basins operated with by mechanical stirring devices can also be utilized but must be regarded as less favorable reactors: A low concentration of carrier material acceptable for a stirrer will allow only small concentration increases for slowly degradable COD, while with higher concentrations interference of carrier material and stirring device might disturb operation. The fluidized bed, where mixing and particle movements occurs by hydraulic flow also has the characteristics of a fully mixed reactor without the potential problems of a mechanically stirred basin.

In order to account for differing required residence times of different wastewater ingredients in the first reactor, it is advantageous to effect retention of the gradually metabolizable pollutants with the use of at least two different types of materials as the medium exhibiting filtering activity. In this connection, it is possible, for example, to combine materials of lower and higher specific gravities. It is also possible to merely combine particles of the same material having different sizes or different-size pores. The combination of filtering media selected depends on the nature of undissolved, macromolecular ingredients in the incoming wastewater stream to be treated, and the selection thereof is conventional. For instance if a waste water (e.g. from meat processing industry) contains suspended solids (e.g. meat particles) as well as emulsified compounds (e.g. fat droplets), both contributing to the slowly degradable COD, it is advisable to use two kinds of filter material, one with macropores greater than 1 mm for the retention of the suspended solids and one with pores smaller than 1 mm preferably a hydrophobic material, for the emulsified ingredients.

In order to enhance the retention effect, of the gradually metabolizable pollutants, it is advantageous to add flocculants and/or precipitants and/or adsorbents. Suitable additives include, but are not limited to, iron hydroxide or aluminum hydroxide as precipitants, activated carbon, bentonite, or bleaching clay as adsorbents. The addition of these materials is especially advantageous when the volume proportion of the filtering or support medium to the total volume of the first reactor is relatively low, for example, in a fluidized-bed process wherein, in addition to having a reduced volume of the filtering or support medium as compared with solid-bed methods, the wastewater ingredients are also subjected to the increased turbulence due to the higher flow velocity of the wastewater.

Precipitants adsorbents or flocculants are added, especially when the substances causing the slowly degradable COD are not sufficiently retained by the filter material alone. So finely dispersed suspended solids can be converted to more retainable particles by precipitation. Colloidal substances can be retained in the filter after adsorption on-to adsorbents. Electrostatically charged particles can be prepared by coagulate by addition of flocculants (e.g. polyelectrolytes)

It is also advantageous when operating in the above-discussed mode, and with a view toward shortening the total residence time in the second reactor to operate the second reactor as a high-power reactor. For this purpose, a load per unit volume of up to 30 kg COD/$m^{3d}$, preferably 8 to 20, more preferably 12 to 18 is maintained in this reactor. High rate reactors are reactors where due to high biomass concentrations high conversion rates are achieved, such as UASB-reactors, anaerobic filters, fluidized beds etc. For general information on high rate anaerobic reactors see e.g. M. Olthof and J. Oleskiewicz, *Chemical Engineering* 23(11), 1982, 121–126.

The apparatus for conducting the process of the invention comprises two reactors, connected in series and constructed for being operated under anaerobic conditions. The first reactor has an inlet for wastewater to be treated and the second reactor has an outlet for treated wastewater as well as a gas exhaust conduit for sewer gas. According to the apparatus of the invention, the first reactor contains a medium capable of providing filtering activity for retaining the pollutants contained in an influent wastewater stream which are present partially in the undissolved, partially in the macromolecular state and are only gradually metabolizable under anaerobic conditions. The volume of the first reactor is designed, depending on the prevailing concentration of the only gradually metabolizable and nondegradable pollutants, to provide a residence time for substantially only the gradually metabolizable pollutants to convert them into low-molecular weight, dissolved fragments.

Preferably the filtering medium is also a support material for microorganisms so that a high biomass concentration can be achieved and maintained in the first reactor. Thus, a quick conversion of the ingredients that are difficult to degrade into low-molecular weight, soluble compounds can be effected.

In this connection, the filtering or support medium can be composed of one or several blocks of a porous material. Alternatively, according to an advantageous embodiment of the invention, the filtering or support medium can be composed of individual matter particles having a diameter of 0.5–50 mm, preferably 1 to 20 mm and with open macropores throughout of 0.1–5 mm, preferably 0.5 to 3 mm.

Such a size of the individual particles results, in conjunction with the open macropores, in a very large settling area for the microorganisms, with the arrangement of the macropores promoting a decentralized growth of the bacteria, which is important to avoid clogging of the pores as well as to provide a large mass transfer.

In order to provide good filtering effect as well as simultaneously, the formation of a settling area increasing the biomass concentration, the medium having filtering activity is preferably a foam material, and/or a ceramic material, and/or activated carbon, and/or swollen clay. However, it is also just as advantageous to provide a medium exhibiting filtering activity composed of synthetic and/or natural fiber bundles. Typically, polyester, polyethylene, "Perlon", i.e., a trademark identifying known fibers of the polyamide group, or jute fiber bundles can be employed as the fiber bundle. By "fiber bundle" a mechanical combination of a certain amount of single fibres to a larger structure of rope-, tissue or brush-like type is meant. Natural fibers are of natural origin such as cotton, jute, asbestos etc, while synthetics fibres are made of manmade material such as plastics, glass, metal etc.

When such fiber bundles are used the microorganisms are provided with a large area settling substrate on the individual fibers, and the undissolved and macromolecular ingredients are deposited and held, in part, on the fibers themselves, and in part in the interstices between the individual fibers of the bundles. The combination of several of the aforementioned materials, or the combination of individual particles with fiber bundles increases the retention of the wastewater ingredients that are difficult to degrade, which may have different retention requirements as previously discussed. As for length and size of fiber bundles, the data given above for porous materials are an appropriate orientation. So, for a fluidized bed short fibre bundles of 0,5 to 10 cm, preferably 1 to 5 cm are used, while with a fixed bed reactor long fibre bundles up to several meters can be applied at random or regular distribution inside the reactor. As COD retention is the main purpose of the fiber material, packing density depends on the properties of the COD-causing particles. So loose packing density is applied for larger suspended solids and more tightly packed fiber bundles are preferred for smaller particles. Again explanations given above for porous filter material hold. Fiber diameters are of little importance. Principally any fiber diameter as it occurs in natural material or in standard industrial production can be used, though very thin fibers, especially those of natural origin may be less favorable due to low mechanical stability.

The retention of wastewater ingredients that are difficult to degrade in the first reactor can also be further enhanced by arranging upstream of this first reactor a device for feeding precipitants and/or flocculants and/or adsorbents. The feeding device can be constructed for dispensing these agents in appropriately metered quantities to the incoming wastewater stream to be treated.

It is also advantageous with a view toward increasing the retention capacity of the first reactor as well as with a view toward increasing the rate of degradation or breakdown of the macromolecular, undissolved wastewater ingredients, to design the first reactor either as a solid-bed or as a fluidized-bed reactor. In either case, the volume of the filtering or support medium can be substantially increased as compared to a stirred flow-through tank or basin.

As a result of the reduction in total reactor volume, possible by the separation and raised concentration of the difficult-to-degrade wastewater ingredients and the high biomass concentration in the first reactor, the process of this invention and the corresponding apparatus can be utilized especially economically for the anaerobic biological purification of highly concentrated industrial wastewaters with undissolved solids and high-molecular weight pollutants.

It is especially well suited, for example, for the anaerobic purification of wastewaters from the fruit and vegetable industry, wastewaters from slaughterhouses and meat-processing plants, from oil and margarine factories, the dairy industry, yeast industry, as well as the chemical industry.

In the context of treating raw wastewater, the present invention is used to achieve a rapid-rate anaerobic digestion of the entire wastewater stream by treating separated low-rate ingredients in a first reactor. Simple sedimentations or filtration of suspended matter, e.g., would only be a partial solution of the waste disposal problem, as the precipitate or filter cake would have to be disposed of after a drying and stabilization-step. The invention thus enables a joint treatment of rapid- and low-rate substances, without letting the low-rate waste require the volume of the reactors to be excessively large to provide long residence times for the entire wastewater stream.

In this context, it should also be noted that primary treatment in this process and system, as well as in the process and system of copending application Ser. No. 578,900, is by no means excluded. Primary treatment, i.e., mechanical removal of suspended matter by sedimentation, centrifugation, flotation, etc., of this kind is a reasonable procedure prior to the process of the invention if there is a way of utilization or easy disposal of the removed matter. For example, meat particles contained in waste-waters of food processing industries are easily removed by filtration and transferred to rendering plants for further processing towards animal food. In such a case, the process of the invention sets in after the primary treatment to separate off minor particles, emulsified and colloidal matter (fat, proteins, etc.).

On the other hand, primary treatment can be used simultaneously with the process of the invention. This will be reasonable whenever there is now way of utilization or easy disposal of mechanically removed suspended matter. In these cases, presumably the vast majority of cases, suspended matter is separated and treated together with other low-rate metabolizable substances, in the first reactor in this process, anaerobically with acidification prior to being passed with high-rate substances to a second reactor for methanization or aerobic treatment.

Finally, there are cases where suspended solids are the only wastewater ingredients with low-rate metabolism, e.g., vegetable and fruit chips from the canning industry, but where there is no way of utilization or easy disposal of mechanically removable matter. In these cases the invention stands for the mechanical removal of the suspended solids and their subsequent anaerobic solubilization and acidification in the first reactor, prior to being passed on with the main-stream to the second reactor for final treatment, e.g., anaerobic methanization or aerobic oxidation.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DISCUSSION OF THE INVENTION

Figure 1:
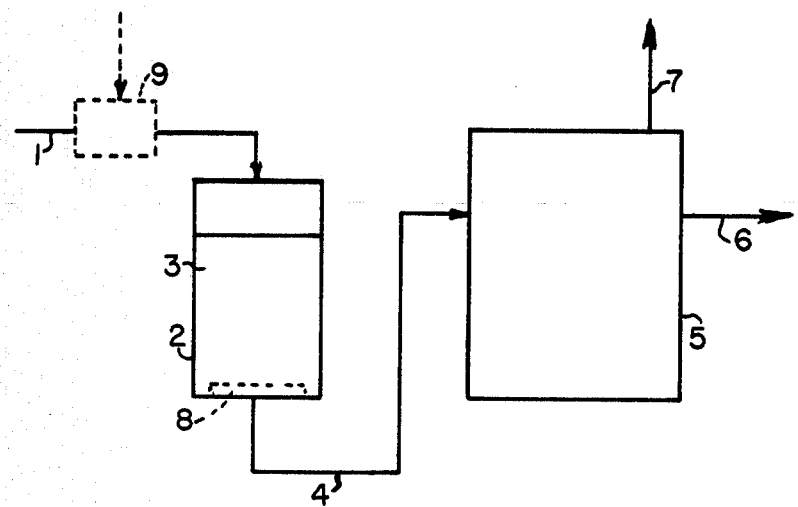
FIG. 1 schematically illustrates one embodiment of an apparatus suitable for conducting the process of this invention having a solid or fixed bed reactor as the first reactor in series.

In all the Figures like elements are numbered the same.

In the Figures, wastewater to be treated is fed through an inlet 1 to a first reactor 2 operated under anaerobic conditions. A filtering medium 3 is arranged in the first reactor 2 and serves simultaneously as a settling or carrier substrate for microorganisms and as a filter medium. For this purpose, the medium 3 can be comprised of, for example, individual particles having a diameter of 0.5–50 mm, preferably 1 to 20 mm and with open macropores throughout of 0.1–5 mm, preferably 0.5 to 3 mm. Suitable materials for use are foam materials, ceramic materials, activated carbon, or swollen clay. However, instead of consisting of individual particles, the medium 3 can also be made up of one or several blocks of the aforementioned materials, or it can be composed of synthetic and/or natural fiber bundles as was previously discussed. To avoid flushing out of the individual particles or fiber bundles, a screen or grid 8 is arranged at the outlet of the first reactor 2, the mesh width of which is smaller than the smallest particle size.

Figure 2:
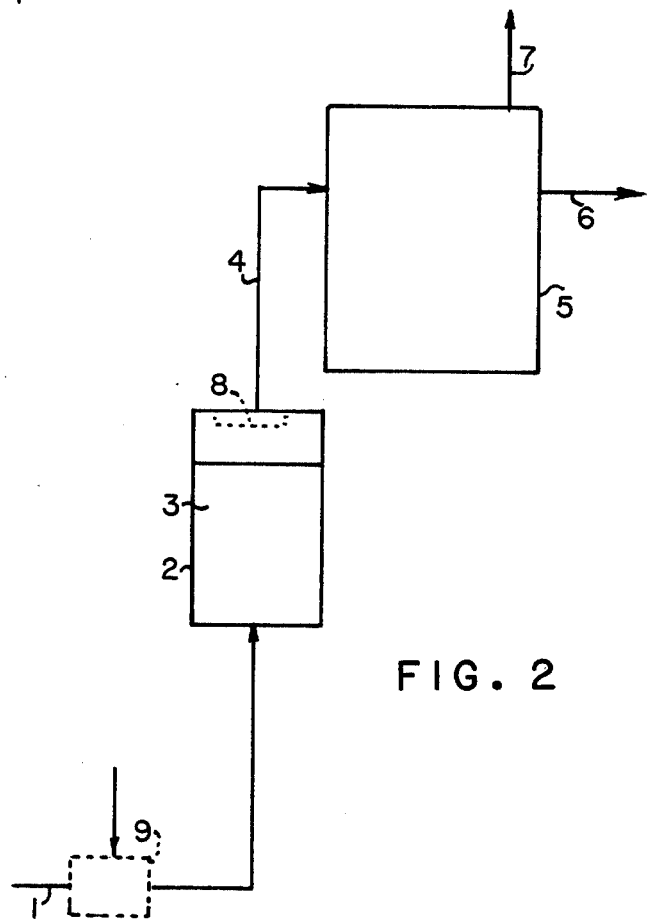
FIG. 2 schematically illustrates the device of FIG. 1 but with the first reactor being a fluidized bed reactor.

A second reactor 5, operated under anaerobic conditions, is connected through a connecting conduit 4 to the first reactor 2 arranged downstream from the latter. This second reactor comprises an outlet 6 for treated waste-water and a gas exhaust conduit 7 for sewer gas, e.g., methane containing gas. In order to operate the first reactor 2 as a solid-bed or fixed-bed reactor as shown in FIG. 1, the inlet 1 is connected at the top and the connecting conduit 4 to the second reactor 5 is connected at the bottom of the first reactor 2. Alternatively, as shown in FIG. 2, the reactor 2 can be a fluidized bed reactor. In this case the inlet and outlet connections are reversed.

As shown by dashed lines, optionally a feeding device 9 for the introduction of flocculants and/or precipitants and/or adsorbents can be arranged in the inlet 1 to enhance the filtering effect in the first reactor 2. This device 9 is constructed for metering suitable quantities of said materials into the incoming wastewater stream.

In operation the undissolved and macromolecular wastewater ingredients which are difficult to degrade are retained in the first reactor 2 as a result of the filtering effect of the medium 3 which is optionally further enhanced by the aforementioned additives. On the other hand, the readily degradable, low-molecular wastewater ingredients, which are initially present already in the dissolved state, are passed essentially unimpeded directly through the reactor 2 and into the second reactor 5. In the first reactor 2, the wastewater ingredients that are difficult to degrade are then converted into dissolved fragments and low-molecular substances by the microorganisms settled on the medium 3, and these fragments and substances are then also introduced into the second reactor 5 for further degradation by way of a combined acidification, acetate-forming, and methane-forming phase.

In this arrangement, the first reactor 2 can be of relatively small volume due to the relative increase in the concentration of the solids and macromolecular compounds being retained therein and to provide for direct passage of the dissolved fragments and low-molecular substances substantially without treatment in the first reactor directly with the second reactor.

Without further elaboration, it is believed that one skilled in the art can, using the preceding description, utilize the present invention to its fullest extent. The following preferred specific embodiments are, therefore, to be construed as a merely illustrative, and not limitative of the remainder of the disclosure in any way whatsoever. In the following example, all temperatures are set forth uncorrected in degrees Celsius; unless otherwise indicated, all parts and percentages are by weight.

EXAMPLE

The numerical example set forth below illustrates the extent to which savings in reactor volume can be achieved by means of the mode of operation according to the invention, as compared to a conventional prior art mode of operation.

In the example the incoming wastestream being purified is an organically highly loaded industrial wastewater fed at a rate of 500 m$^3$/day and having a COD content of 10,000 mg/l, i.e., about 5,000 kg/day. The organic load of the wastewater, expressed as COD, is composed, in this connection, of 60% of readily degradable compounds, i.e., about 3,000 kg COD$_x$/day, 30% difficult-to-degrade compounds, i.e., about 1,500 kg COD$_y$/day, and 10% nondegradable compounds, i.e., about 500 kg COD$_z$/day.

Anaerobic degradation is conducted at stabilized operating conditions, i.e., the microorganisms of the individual anaerobic degradation stages are present in a high, approximately constant concentration.

In both cases in this example, for COD degradation and/or for conversion of difficult-to-degrade COD into readily degradable COD, a reaction rate of the first order applies as an approximation, resulting in the following equation:

$$dCOD/dt = k \cdot COD;$$

which when integrated results in the equation:

$$COD_t = COD_0/(1 + k \cdot t), \text{ wherein}$$

$COD_t$ = COD in reactor effluent after a reaction period of t (kg/d)

$COD_0$ = COD in reactor influent (kg/d)

k = velocity constant of the first order (1/d) for the respective COD degradation or COD conversion reaction t = residence time of COD in reactor (d).

The following assumptions are made for the rate constants:

$k_x = 3 \cdot d^{-1}$ for conversion of readily degradable $COD_x$ into $CH_4$ and $CO_2$ $k_y = 0.2 \cdot d^{-1}$ for conversion of difficult-to-degrade $COD_y$ into readily degradable $COD_x$.

The following residence time results from the aforementioned equation of the first order, using a conventional reactor with throughput of the entire wastewater stream, and assuming that 90% of the entire COD is readily degradable:

$$t_x = (COD_{x0} - COD_{tx})/COD_{xt} \times k_x = 3d$$
$$(COD_{xt} = COD_z)$$

Thus, the required reactor volume for this case with an influent stream of 500 m$^3$/day is 1,500 m$^3$.

In order to convert the difficult-to-degrade COD$_y$ into readily degradable COD$_x$, the following residence time results from the above-mentioned equation of the first order:

$$t_y = (COD_y + COD_z) - COD_z)/COD_{yt} \times k_y = 15 \text{ d};$$

(wherein $COD_{yt} = COD_z$).

Accordingly, a reactor volume of 7,500 m$^3$ is required for the gradual conversion of COD$_y$ into COD$_x$.

When using the mode of operation of this invention, it can be assumed that $COD_y + COD_z = 2,000$ kg are concentrated by a factor of 10 in the first reactor containing a filtering and support medium. The concentration of the combined difficult-to-degrade COD$_y$ and non-degradable COD$_z$ based on the incoming stream composition initially described then rises from a total COD$_y$+COD$_z$ of 4,000 to 40,000 mg/l. Considering the conversion time of COD$_y$ into COD$_x$, which is 15 days, the required reactor volume for this first reactor is then 750 m$^3$.

The entire reactor volume is accordingly composed of 750 m$^3$ for the conversion of higher-concentrated COD$_y$ into COD$_x$ in the first reactor, plus 1,500 m$^3$ for conversion of COD$_x$ into methane and CO$_2$ in the second reactor. This results in a total reactor volume of 2,250 m$^3$ as compared to a conventional reactor with a volume of 7,500 m$^3$. The total reactors volume savings according to the invention is thus about 70%.

To facilitate understanding of the above example, further information is provided as follows:

The wastewater is from a food-canning factory, and contains easily degradable organics, e.g., acetic acid from sauerkraut production, and slowly degradable ingredients, such as vegetable debris.

The slowly degradable substances are retained in the first reactor by means of a filter medium of open pore foam material.

The first reactor is a fixed bed reactor and contains 80% by volume of filter material. In addition, retention of the slowly degradable substances in the first reactor is aided by metering a polymer flocculant aid and ferric chloride with the influent waste stream.

As far as the anaerobic microorganisms are concerned, there are no specific requirements to be fulfilled. Anaerobic bacteria, as they are ubiquitous in municipal sludge digestion, e.g., are applied for start-up; those microorganisms that are best acclimated to a given substrate and reaction condition will prevail soon after start-up. In the second reactor with methane production as the final metabolism step, a wide variety of microorganisms will be present in the neutral pH range (6.8–7.8), while in the first reactor slightly acidic conditions (pH 5–6.5) will provide optimal conditions for hydrolyzing and acidifying bacteria, whereas methanogenic bacteria are not present.

Reactor temperatures are in the mesophilic (20°–35° C.) or thermophilic range (50°–65° C.) with temperature control by conventional cooling.

The preceding example can be repeated with similar success by substituting the generically or specifically described reactants and/or operation conditions of this invention for those used in the preceding example.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In a process for the anaerobic biological purification of wastewater containing organic pollutants wherein the incoming wastewater stream to be purified is conducted through two series-connected reactors operated under anaerobic conditions, the improvement comprising retaining substantially only the pollutants contained in the incoming wastewater stream which are present partially in the undissolved, partially in the macromolecular state and are only gradually metabolizable under anaerobic conditions in the first reactor by means of a filtering medium arranged in the first reactor; transferring the pollutants which are initially present in the incoming wastewater stream in the dissolved state and are substantially rapidly degradable by anaerobic microorganisms directly through the first reactor and without substantial conversion, into the second reactor; retaining the only gradually metabolizable pollutants in the first reactor for a time sufficient to degrade the gradually metabolizable pollutants to low-molecular weight, dissolved fragments, said first reactor being operated at a pH of less than 7, and containing hydrolyzing and acidifying bacteria and substantially no methanogenic bacteria; and conducting the thus-degraded and dissolved low-molecular weight fragments to the second reactor together with the initially rapidly degradable pollutants for further degradation therein in the presence of methanogenic bacteria so as to produce methane, the entire reactor volume of the first and second reactors being just about sufficient to conduct the degradation in the first reactor and the methanization in the second reactor on a continuous basis, said entire reactor volume being less than the reactor volume required if the degradation and the methanization were conducted in a single reactor.

2. A process according to claim 1, wherein the filtering medium is also a settling substrate for microorganisms employed in conducting the process in the first reactor.

3. A process according to claim 2, further comprising adding at least one of flocculants, precipitants and adsorbents to the first reactor to enhance filtering of the slowly metabolizable pollutants.

4. A process according to claim 1, further comprising operating the first reactor as one of a solid-bed and fluidized-bed reactor.

5. A process according to claim 1, wherein the retaining of the slowly metabolizable pollutants is effected by using at least two different-type materials as the filtering medium in the first reactor.

6. A process according to claim 1, further comprising adding at least one of flocculants, precipitants and adsorbents to the first reactor to enhance filtering of the slowly metabolizable pollutants.

7. A process according to claim 1, further comprising operating the second reactor as a high-power reactor.

8. A process according to claim 1, wherein the influent wastewater is a wastewater stream from a food processing plant containing meat particles suspended therein, and further comprising separating the meat particles in a preliminary step and transferring said meat particles to a further processing step for conversion to animal food, then passing the thus-treated influent to the first reactor to separate and treat minor particles, emulsified and colloidal matter, fats and proteins.

9. A process according to claim 1, wherein the filtering medium is retained in the first reactor by means of a screen or grid and thereby prevented from passing to the second reactor.

10. A process according to claim 1, wherein the first reactor is operated at a pH of 5–6.5 and the second reactor is operated at a pH of 6.8–7.8.

11. A process according to claim 1, wherein said two reactors constitute the entire biological wastewater treatment of raw incoming wastewater.

12. A process according to claim 1, further comprising a preceding step of subjecting the wastewater to primary treatment and biologically treating the resultant wastewater in only said first and second reactors.

* * * * *